US012583716B2

(12) United States Patent
Cui et al.

(10) Patent No.: US 12,583,716 B2
(45) Date of Patent: Mar. 24, 2026

(54) INTELLIGENT CONTROL SYSTEM FOR WINCH MOTOR

(71) Applicant: Ningbo Lianda Winch Co., Ltd., Ningbo (CN)

(72) Inventors: Qinpeng Cui, Ningbo (CN); Xiaojun Cui, Ningbo (CN)

(73) Assignee: Ningbo Lianda Winch Co., Ltd., Ningbo (CN)

( * ) Notice: Subject to any disclaimer, the term of this patent is extended or adjusted under 35 U.S.C. 154(b) by 432 days.

(21) Appl. No.: 18/198,295

(22) Filed: May 17, 2023

(65) Prior Publication Data

US 2024/0174497 A1 May 30, 2024

(30) Foreign Application Priority Data

Nov. 24, 2022 (CN) ........................ 202223133005.0

(51) Int. Cl.
*B66D 1/00* (2006.01)
*B66D 1/12* (2006.01)
*B66D 1/48* (2006.01)

(52) U.S. Cl.
CPC ............... *B66D 1/485* (2013.01); *B66D 1/12* (2013.01)

(58) Field of Classification Search
CPC . B66D 1/12; B66D 1/485; B66D 1/46; B66D 3/18; B66D 3/24; B66D 2700/025
See application file for complete search history.

(56) References Cited

U.S. PATENT DOCUMENTS

| | | | | |
|---|---|---|---|---|
| 4,873,474 A * | 10/1989 | Johnson | B66D 1/40 | 318/434 |
| 6,864,650 B2 * | 3/2005 | Heravi | B66D 1/58 | 388/933 |
| 8,076,885 B2 * | 12/2011 | Heravi | H02H 7/0855 | 318/434 |
| 8,958,956 B1 * | 2/2015 | Felps | H02J 7/00306 | 254/362 |
| 9,014,913 B2 * | 4/2015 | Heravi | G08C 17/00 | 254/344 |
| 10,958,265 B1 * | 3/2021 | Sullivan | B66D 1/485 | |
| 11,840,431 B2 * | 12/2023 | Felps | B66D 1/485 | |
| 2019/0092608 A1 * | 3/2019 | Cui | B66D 1/00 | |
| 2019/0382247 A1 * | 12/2019 | Cui | B66D 1/12 | |
| 2020/0244091 A1 * | 7/2020 | Ehlert | B66D 1/525 | |

* cited by examiner

*Primary Examiner* — Emmanuel M Marcelo
(74) *Attorney, Agent, or Firm* — Bayramoglu Law Offices LLC

(57) ABSTRACT

The present invention discloses an intelligent control system for a winch motor, comprising: a duplex switching relay; a contact end of the duplex switching relay comprises a first conductive sheet, a second conductive sheet, a third conductive sheet and a fourth conductive sheet, a winch motor, comprising an inner stator winding coil and an outer rotor motor; a running parameter collecting module, configured to collect electric current and running time length parameters of the winch motor in operation and/or a temperature parameter of the winch motor in operation; a controller, configured to control a conducted state of the duplex switching relay, and electrically connected to a coil control end of the duplex switching relay to protect the winch motor by cutting off power source in time when excess heat is generated after a long time of normal operation of the winch motor.

15 Claims, 5 Drawing Sheets

INTELLIGENT CONTROL SYSTEM FOR WINCH MOTOR

This application is based upon and claims priority to Chinese Patent Application No. 202223133005.0, filed on Nov. 24, 2022, the entire contents of which are incorporated herein by reference.

TECHNICAL FIELD

The present disclosure relates to the field of control technologies of winch motors, and in particular to an intelligent control system for a winch motor.

BACKGROUND

As a winch pulls, a winch motor, as a major power source, should be specially protected during its operation. In the prior arts, a forward and backward rotation winch motor is disposed, which usually includes an inner stator coil and an outer rotor motor. By controlling an electric current direction of the inner stator coil, a rotation direction of the outer rotor motor can be adjusted. In order to protect normal operation of the forward and backward rotation winch motor against any damage, an electric current parameter of the winch motor in operation is usually collected to check whether the electric current parameter exceeds a threshold, and then the inner stator coil and the outer rotor motor are respectively controlled to be turned on and off by two relays to achieve power loss protection for the winch motor.

During the operation process of the winch motor, its operation current is sometimes within a preset range. But, after a period of time of operation, the winch motor may generate a large amount of heat which sometimes brings impact onto the motor. For example, the events such as local spontaneous combustion may occur to the winch motor. If a conventional winch motor protection circuit is adopted, such protections cannot be provided, thereby causing damages to the winch motor.

SUMMARY

In order to address the above technical problem, the present disclosure provides an intelligent control system for a winch motor so as to solve the problem that the winch motor cannot be protected due to failure to cut off power source in time when excess heat is generated after a long time of normal operation of the winch motor in the prior arts.

In order to solve the above problem, the present disclosure provides the following technical solution: an intelligent control system for a winch motor, comprising:

- a duplex switching relay, configured to control a power source to be connected to a winch motor or not; where a contact end of the duplex switching relay comprises a first conductive sheet, a second conductive sheet, a third conductive sheet and a fourth conductive sheet, and the first conductive sheet is electrically connected with a positive pole of the power source;
- a winch motor, comprising an inner stator winding coil and an outer rotor motor; where one end of the inner stator winding coil is electrically connected to the third conductive sheet, the other end of the inner stator winding coil is electrically connected to the fourth conductive sheet, one end of the outer rotor motor is electrically connected to the second conductive sheet, and the other end of the outer rotor motor is electrically connected to a negative pole of the power source;

- a running parameter collecting module, configured to collect electric current and running time length parameters of the winch motor in operation and/or a temperature parameter of the winch motor in operation;
- a controller, configured to, based on the collected electric current and running time length parameters and/or temperature parameter, control a conducted state of the duplex switching relay; where the controller is electrically connected to a coil control end of the duplex switching relay.

The conducted state comprises the third conductive sheet being electrically conducted with the first conductive sheet or the second conductive sheet; and further comprises the fourth conductive sheet being electrically conducted with the first conductive sheet or the second conductive sheet.

Compared with the prior arts, the present disclosure has the following advantages: by collecting the electric current and the corresponding running time length of the winch motor in operation or the temperature information of the winch motor in operation, the power source of the winch motor is cut off in time to prevent overheating of the winch motor, achieving the purpose of protecting the winch motor.

Preferably, the controller comprises a control chip and a switching control module. The coil control end of the duplex switching relay comprises a first control coil for controlling the fourth conductive sheet to be electrically conducted with the first conductive sheet or the second conductive sheet, and a second control coil for controlling the third conductive sheet to be electrically conducted with the first conductive sheet or the second conductive sheet. The switching control module comprises a first contact end, a second contact end and a common end. The first contact end is electrically connected to one end of the first control coil, and the second contact end is electrically connected to one end of the second control coil. The other end of the first control coil and the other end of the second control coil are both electrically connected to the negative pole of the power source. The common end is electrically connected to the positive pole of the power source. The control chip, based on the collected electric current and running time length parameters and/or temperature parameter, controls the common end to cut off electrical connection with the first contact end or the second contact end or not.

The following technical effect can be achieved by the technical solution: by controlling the switching control module through the control chip, the coil control end of the duplex switching relay can be controlled, which facilitates connection of the conductive sheets of the contact end of the duplex switching relay, achieving easy control.

Preferably, the running parameter collecting module comprises a temperature sensor for collecting a temperature of the winch motor in operation. The temperature sensor is disposed inside the winch motor and is electrically connected to the control chip through a soft lead wire.

The following technical effect can be achieved by the technical solution: the temperature sensor is disposed inside the winch motor, which means the temperature sensor may be disposed on the inner stator winding coil or on an inner wall of the outer rotor motor, so as to most accurately collect the running temperature inside the winch motor.

Preferably, the temperature sensor is disposed on the inner stator winding coil, and a tightening strap for fixing the temperature sensor onto the inner stator winding coil is disposed in the winch motor.

The following technical effect can be achieved by the technical solution: the heat of the winch motor mainly comes from the inner stator winding coil, and thus, by disposing the temperature sensor on the inner stator winding coil, the temperature inside the winch motor can be most accurately collected; by using the tightening strap, the temperature sensor can be closely attached to the inner stator winding coil to prevent movement of the temperature sensor.

Preferably, the temperature sensor is a thermocouple temperature probe.

The following technical effect can be achieved by the technical solution: the thermocouple temperature probe is disposed in such a way that the probe is closely attached to the inner stator winding coil to facilitate collection of temperature data.

Preferably, the running parameter collecting module comprises an electric current sensor for collecting an electric current of the winch motor in operation and a timer for recording a running time length of the winch motor after collection of the electric current parameter. The electric current sensor and the timer both are electrically connected to the control chip. The control chip, based on a preset electric current range of the collected electric current parameter, generates a corresponding preset running time length of the winch motor. The control chip determines whether the running time length of the winch motor recorded by the timer exceeds the corresponding preset running time length of the winch motor so as to control the common end to cut off connection with the first contact end or the second contact end or not.

The following technical effect can be achieved by the technical solution: an electric current range is determined based on the collected electric current parameter and further a corresponding preset running time length of the winch motor under the current electric current is determined. The control chip can, based on the running time length of winch motor recorded by the timer and the corresponding preset running time length of the winch motor, cut off the power source in time to prevent excess heat generated due to long-time operation of the winch motor, thus avoiding affecting subsequent running state of the winch motor.

Preferably, the electric current sensor is a splitter or direct current transformer.

The following technical effect can be achieved by the technical solution: since the splitter has a constant resistance, the operation current of the winch motor can be measured by simply collecting the voltage information of the splitter. The splitter has small volume and is easy to fix. The direct current transformer can be easily mounted without using a circuit, helping collection of the electric current.

Preferably, a prompting module for prompting that the temperature and/or electric current parameters of the winch motor in operation exceed a preset value is further disposed on the controller.

The following technical effect can be achieved by the technical solution: the prompting module prompts the running state of the winch motor such that an operator can easily identify it and hence adjust the working state of the winch motor in time.

Preferably, the prompting module comprises a loudspeaker and/or an indicator lamp, where the loudspeaker and/or indicator lamp are electrically connected to the controller.

The following technical effect can be achieved by the technical solution: the sound prompt of the loudspeaker or the color prompt of the indicator lamp can be easily captured.

Preferably, the controller is further electrically connected to a Bluetooth control module, where the Bluetooth control module is in communication with a wireless control panel.

The following technical effect can be achieved by the technical solution: with the Bluetooth control module in communication with the wireless control panel, remote control can be achieved.

Figure 1:
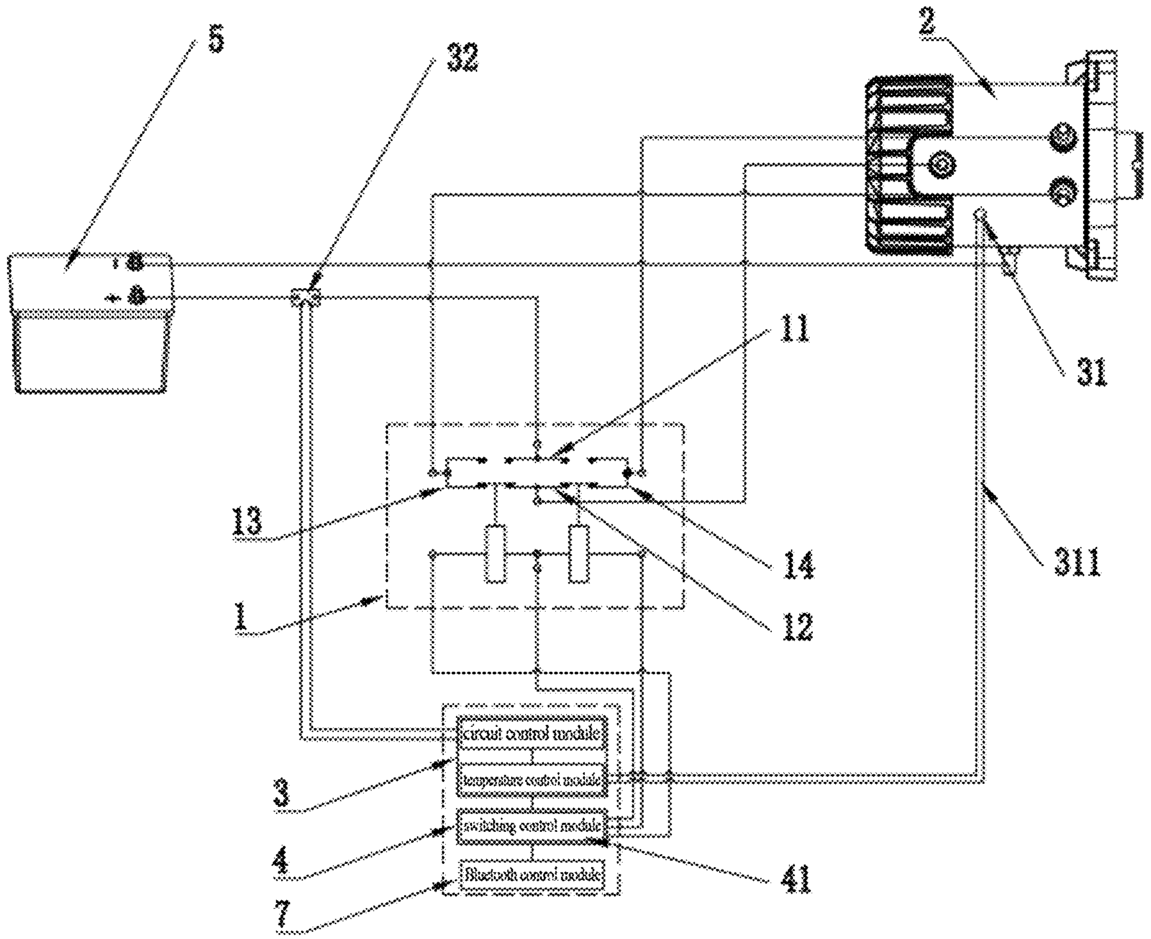
FIG. 1 is a schematic diagram illustrating an entire structure of an intelligent control system for a winch motor according to the present disclosure.

Numerals of the drawings are described below: 1. duplex switching relay, 11. first conductive sheet, 12. second conductive sheet, 13. third conductive sheet, 14. fourth conductive sheet, 15. first control coil, 16. second control coil, 2. winch motor, 21. inner stator winding coil, 22. outer rotor motor, 3. running parameter collecting module, 31. temperature sensor, 311. soft lead wire, 32. electric current sensor, 4. controller, 41. switching control module, 411. first contact end, 412. second contact end, 413. common end, 5. power source, 6. tightening strap, 7. Bluetooth control module.

EMBODIMENTS

In order to make the above subjects, features and advantages of the present disclosure clearer and more intelligible, the specific embodiments of the present disclosure will be detailed below in combination with accompanying drawings.

As shown in FIGS. 1 to 5, an embodiment provides an intelligent control system for a winch motor, which includes:

- a duplex switching relay 1, configured to control a power source 5 to be connected to a winch motor 2 or not; where a contact end of the duplex switching relay 1 comprises a first conductive sheet 11, a second conductive sheet 12, a third conductive sheet 13 and a fourth conductive sheet 14, and the first conductive sheet 11 is electrically connected with a positive pole of the power source 5;
- a winch motor 2, comprising an inner stator winding coil 21 and an outer rotor motor 22; where one end of the inner stator winding coil 21 is electrically connected to the third conductive sheet 13, the other end of the inner stator winding coil 21 is electrically connected to the fourth conductive sheet 14, one end of the outer rotor motor 22 is electrically connected to the second conductive sheet 12, and the other end of the outer rotor motor 22 is electrically connected to a negative pole of the power source 5;
- a running parameter collecting module 3, configured to collect electric current and running time length parameters of the winch motor 2 in operation and/or a temperature parameter of the winch motor 2 in operation;

a controller 4, configured to, based on the collected electric current and running time length parameters and/or temperature parameter, control a conducted state of the duplex switching relay 1; where the controller 4 is electrically connected to a coil control end of the duplex switching relay 1.

The conducted state comprises the third conductive sheet 13 being electrically conducted with the first conductive sheet 11 or the second conductive sheet 12; and further comprises the fourth conductive sheet 14 being electrically conducted with the first conductive sheet 11 or the second conductive sheet 12.

By collecting the electric current and corresponding running time length of the winch motor 2 in operation or the temperature information of the winch motor 2 in operation, the power source 5 of the winch motor 2 is cut off in time to prevent overheating of the winch motor 2, achieving the purpose of protecting the winch motor 2.

In this embodiment, the controller 4 comprises a control chip and a switching control module 41. The coil control end of the duplex switching relay 1 comprises a first control coil 15 for controlling the fourth conductive sheet 14 to be electrically conducted with the first conductive sheet 11 or the second conductive sheet 12, and a second control coil 16 for controlling the third conductive sheet 13 to be electrically conducted with the first conductive sheet 11 or the second conductive sheet 12.

The switching control module 41 comprises a first contact end 411, a second contact end 412 and a common end 413. The first contact end 411 is electrically connected to one end of the first control coil 15, and the second contact end 412 is electrically connected to one end of the second control coil 16. The other end of the first control coil 15 and the other end of the second control coil 16 are both electrically connected to the negative pole of the power source 5. The common end 413 is electrically connected to the positive pole of the power source 5.

The control chip, based on the collected electric current and running time length parameters and/or temperature parameter, controls the common end 413 to cut off electrical connection with the first contact end 411 or the second contact end 412 or not.

By controlling the switching control module 41 through the control chip, the coil control end of the duplex switching relay 1 can be controlled, which facilitates connection of the conductive sheets of the contact end of the duplex switching relay 1, achieving easy control.

Working Principle

Figure 2:
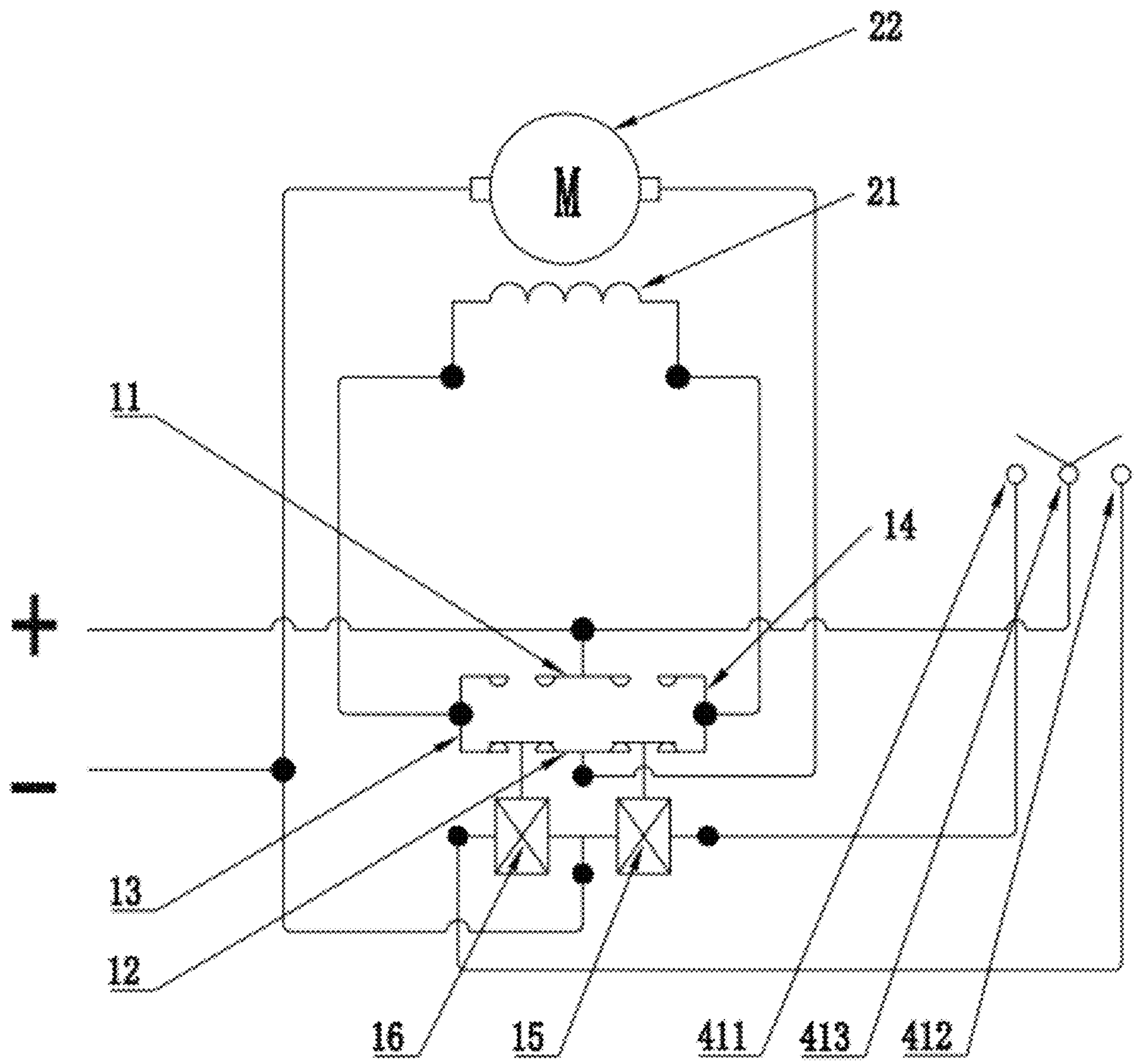
FIG. 2 is a circuit connection diagram illustrating an intelligent control system in a quiesced state for a winch motor according to the present disclosure.

In a quiesced state, by referring to FIG. 2, no electric current flows into the first control coil 15 and the second control coil 16. At this time, the second conductive sheet 12 is electrically connected with the third conductive sheet 13, and further electrically connected to the fourth conductive sheet 14, and no electric current flows through the inner stator winding coil 21 of the winch motor 2. At this time, the winch motor 2 is not started.

Figure 3:
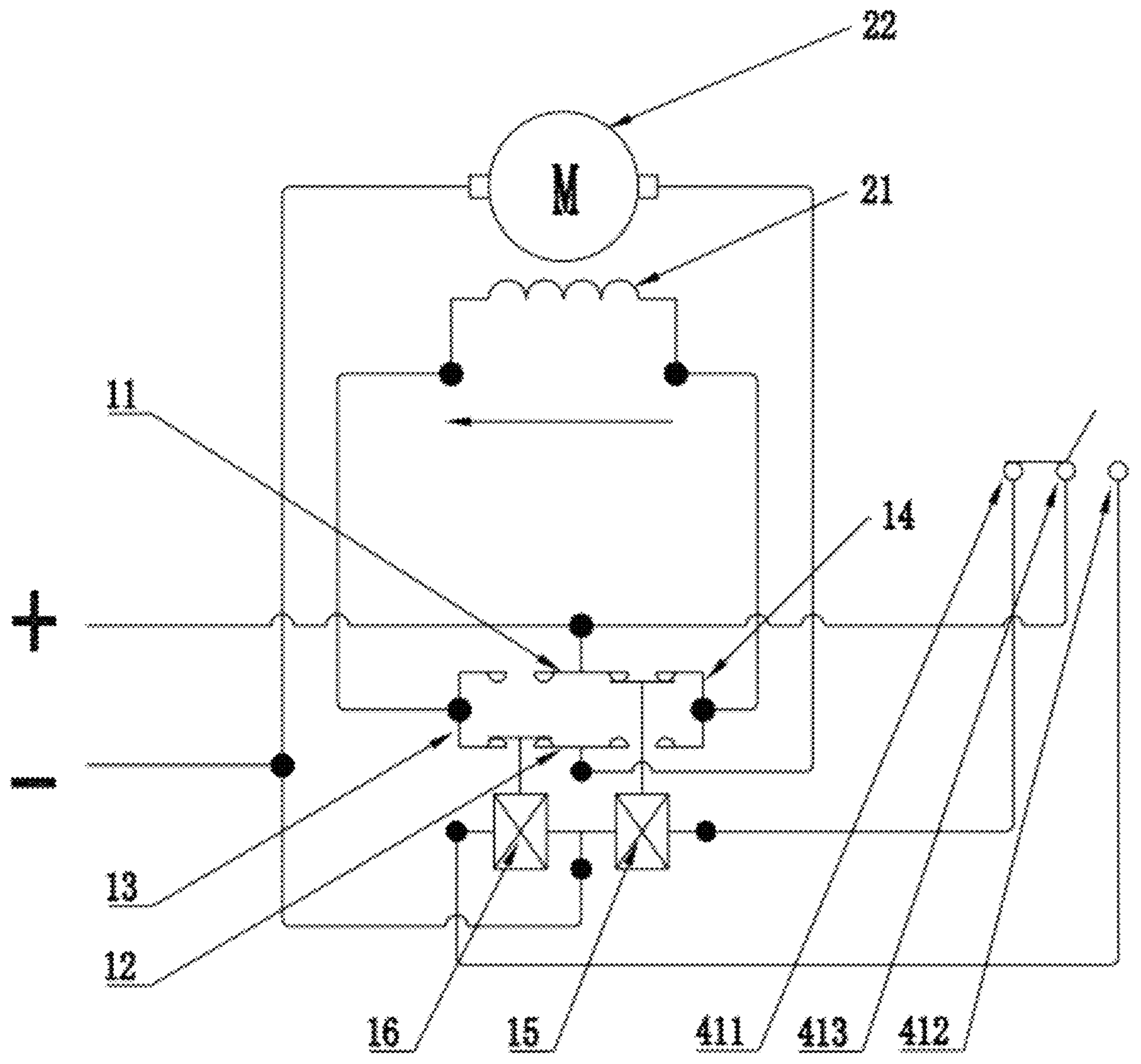
FIG. 3 is a circuit connection diagram illustrating an intelligent control system of a winch motor at the time of clockwise operation of the winch motor according to the present disclosure.

Manual start: by referring to FIG. 3, the switching control module 41 is toggled to enable the common end 413 to be electrically connected to the first contact end 411. At this time, the first control coil 15 is powered on to push an internal movable spring sheet to enable the fourth conductive sheet 14 to be electrically connected to the first conductive sheet 11. At this time, the electric current flows in the following direction: the positive pole of the power source 5→the first conductive sheet 11→the fourth conductive sheet 14→one end of the inner stator winding coil 21→the other end of the inner stator winding coil 21→the third conductive sheet 13→the second conductive sheet 12→one end of the outer rotor motor 22→the other end of the outer rotor motor 22→the negative pole of the power source 5. In this way, clockwise operation of the winch motor 2 can be achieved.

Figure 4:
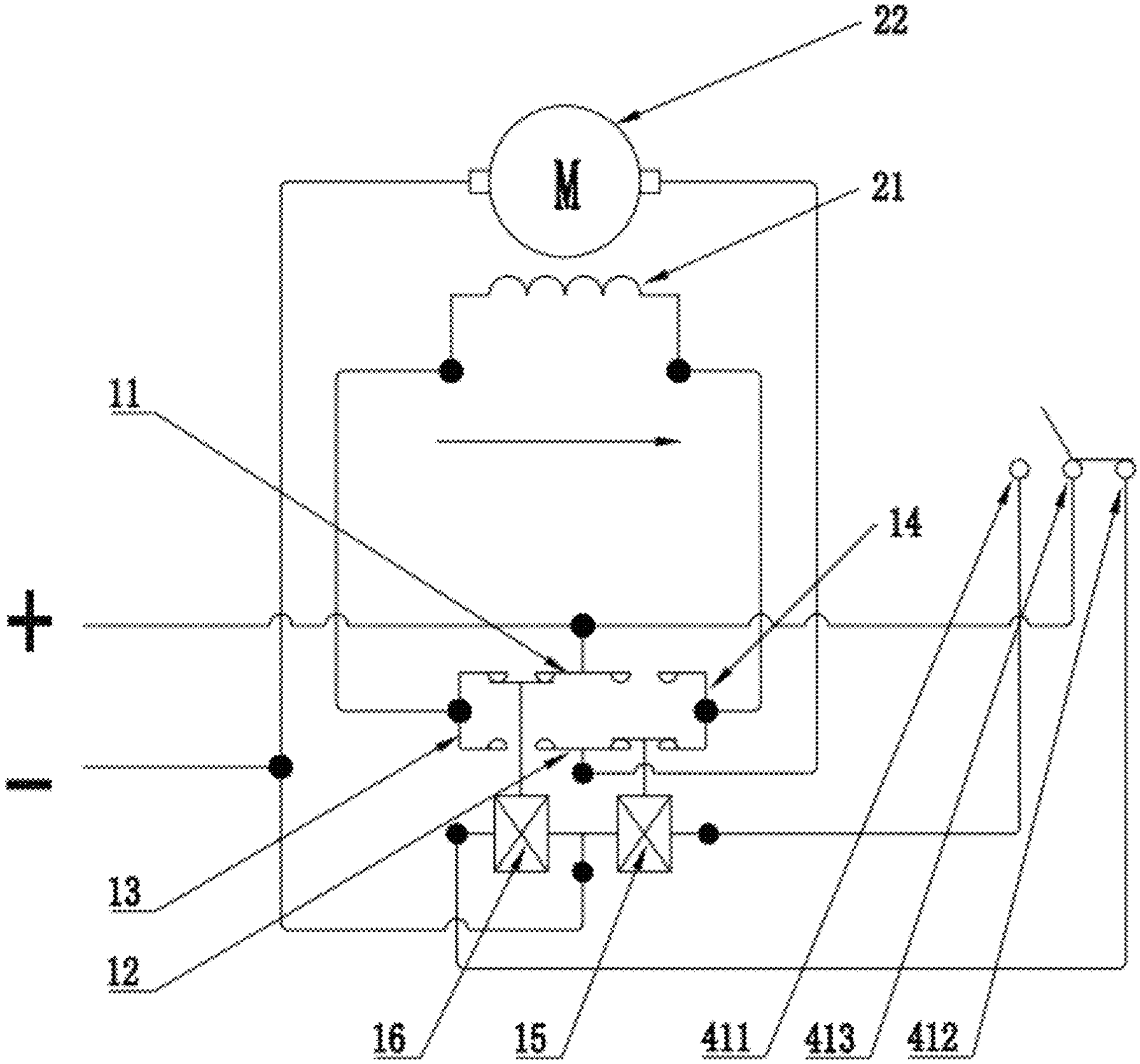
FIG. 4 is a circuit connection diagram illustrating an intelligent control system for a winch motor at the time of counterclockwise operation of the winch motor according to the present disclosure.

(By referring to FIG. 4, the switching control module 41 is toggled to enable the common end 413 to be electrically connected to the second contact end 412. At this time, the second control coil 16 is powered on to push an internal movable spring sheet to enable the third conductive sheet 13 to be electrically connected to the first conductive sheet 11. At this time, the electric current flows in the following direction: the positive pole of the power source 5→the first conductive sheet 11→the third conductive sheet 13→the other end of the inner stator winding coil 21→one end of the inner stator winding coil 21→the fourth conductive sheet 14→the second conductive sheet 12→one end of the outer rotor motor 22→the other end of the outer rotor motor 22→the negative pole of the power source 5. In this way, counterclockwise operation of the winch motor 2 can be achieved).

Trigger disconnection: the controller, based on the parameter information collected by the running parameter collecting module 3, triggers the resetting of switching control module 41 to cut off the connection between the common end 413 and the first contact end 411 or the second contact end 412, so as to cut off power supply of the power source 5 of the winch motor 2 by the duplex switching relay 1, thus achieving the purpose of protecting the winch motor 2.

The running parameter collecting module 3 comprises a temperature sensor 31 for collecting a temperature of the winch motor 2 in operation. The temperature sensor 31 is disposed inside the winch motor 2 and is electrically connected to the control chip through a soft lead wire 311.

The temperature sensor 31 is disposed inside the winch motor 2, which specifically means the temperature sensor 31 may be disposed on the inner stator winding coil 21 or on an inner wall of the outer rotor motor 22, so as to most accurately collect the running temperature inside the winch motor 2.

Figure 5:
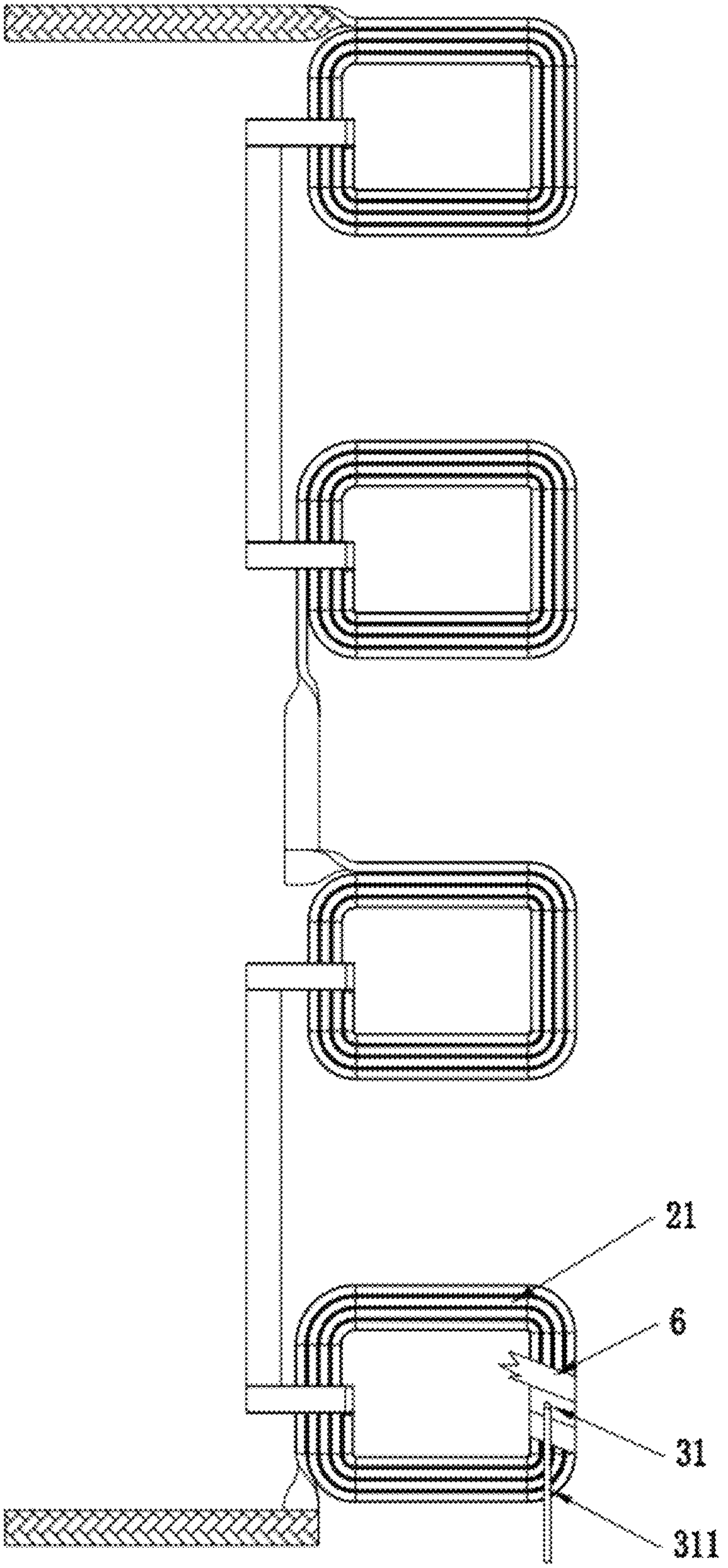
FIG. 5 is a structural diagram illustrating a position of a temperature sensor in an intelligent control system of a winch motor according to the present disclosure.

By referring to FIG. 5, the temperature sensor 31 is disposed on the inner stator winding coil 21, and a tightening strap 6 for fixing the temperature sensor 31 onto the inner stator winding coil 21 is disposed in the winch motor 2.

The heat of the winch motor 2 mainly comes from the inner stator winding coil 21, and by using the tightening strap 6, the temperature sensor 31 can be closely attached to the inner stator winding coil 21 to collect more accurate temperature data.

The temperature sensor 31 is a thermocouple temperature probe. The thermocouple temperature probe is disposed in such a way that the probe is closely attached to the inner stator winding coil to facilitate collection of temperature data. Certainly, a thermal resistor may also be used to detect the temperature.

Specifically, in this embodiment, when the thermocouple temperature probe detects the temperature exceeds 140° C. (set by the controller through adjustment), the power supply of the power source 5 of the winch motor 2 is cut off. When the temperature in the winch motor 2 is lowered to below 50° C., the controller controls the common end 413 of the switching control module 41 again to be electrically connected to the first contact end 411 or the second contact end 412.

In this embodiment, the running parameter collecting module 3 comprises an electric current sensor 32 for collecting an electric current of the winch motor 2 in operation, and a timer for recording a running time length of the winch motor 2 after collection of the electric current parameter. The electric current sensor 32 and the timer are both electrically connected to the control chip.

The control chip, based on a preset electric current range of the collected electric current parameter, generates a corresponding preset running time length of the winch motor 2. The control chip determines whether the running time length of the winch motor 2 recorded by the timer exceeds the corresponding preset running time length of the winch motor 2 so as to control the common end 413 to cut off connection with the first contact end 411 or the second contact end 412 or not.

An electric current range is determined based on the collected electric current parameter and further a corresponding preset running time length of the winch motor 2 under the current electric current is determined. The control chip can, based on the running time length of winch motor 2 recorded by the timer and the corresponding preset running time length of the winch motor 2, cut off the power source 5 in time to prevent excess heat generated due to long-time operation of the winch motor 2, thus avoiding affecting subsequent running state of the winch motor 2.

Specifically, in this embodiment, if the electric current parameter is detected to be ≤1 A (settable), when the time length recorded by the timer is more than 30 minutes (settable), it is considered that the winch motor 2 does not work. At this time, the controller may control the switching control module 41 to cut off power supply of the power source 5.

If the electric current parameter is detected to be 100 A (settable), when the time length recorded by the timer is 15 minutes (settable), power supply of the power source of the winch motor 2 is cut off.

If the electric current parameter is detected to be 200 A (settable), when the time length recorded by the timer is 10 minutes (settable), power supply of the power source of the winch motor 2 is cut off.

If the electric current parameter is detected to be ≥350 A (settable), when the time length recorded by the timer is 0 minute (settable), power supply of the power source of the winch motor 2 is cut off immediately.

The electric current sensor 32 is a splitter. Since the splitter has a constant resistance, the operation current of the winch motor can be measured by simply collecting the voltage information of the splitter. The splitter has small volume and is easy to fix.

The electric current sensor 32 may also be a direct current transformer. The direct current transformer can be easily mounted without using a circuit, helping collection of the electric current.

In this embodiment, a prompting module for prompting that the temperature and/or electric current parameters of the winch motor 2 in operation exceed a preset value is further disposed on the controller 4. The prompting module prompts the running state of the winch motor such that an operator can easily identify it and hence adjust the working state of the winch motor in time.

The prompting module comprises a loudspeaker and/or an indicator lamp, where the loudspeaker and/or indicator lamp are electrically connected to the controller 4. The sound prompt of the loudspeaker or the color prompt of the indicator lamp can be easily captured.

In this embodiment, in addition to its wired control, wireless control can be set up. Specifically, the controller is further electrically connected to a Bluetooth control module 7, where the Bluetooth control module 7 is in communication with a wireless control panel. With the Bluetooth control module 7 in communication with the wireless control panel, remote control can be achieved.

The present disclosure has the beneficial effect: by collecting the electric current and the corresponding running time length of the winch motor 2 in operation or the temperature information of the winch motor 2 in operation, the power source 5 of the winch motor 2 is cut off in time to prevent overheating of the winch motor 2, achieving the purpose of protecting the winch motor 2.

Several preferred embodiments of the present disclosure are illustrated and described as above. As mentioned above, it should be understood that the present disclosure is not limited to the form disclosed by the present disclosure herein and shall not be considered as excluding other embodiments but used for various other combinations, modifications and environments and modified based on the above teachings and technologies and knowledge of relevant field within the scope devised in the present disclosure. Those changes and modifications made by persons skilled in the art within the spirit and scope of the present disclosure shall fall within the scope of protection of the appended claims.

Although the present disclosure discloses as above, the scope of protection of the present disclosure is not limited hereto. Those skilled in the art may make various changes and modifications within the spirit and scope of the present disclosure and these changes and modifications shall fall within the scope of protection of the present disclosure.

The invention claimed is:

1. An intelligent control system for a winch motor, wherein the control system comprises:

a duplex switching relay (1), configured to control a power source (5) to be connected to a winch motor (2); a contact end of the duplex switching relay (1) comprises a first conductive sheet (11), a second conductive sheet (12), a third conductive sheet (13) and a fourth conductive sheet (14), and the first conductive sheet (11) is electrically connected with a positive pole of the power source (5);

a winch motor (2), comprising an inner stator winding coil (21) and an outer rotor motor (22); where one end of the inner stator winding coil (21) is electrically connected to the third conductive sheet (13), the other end of the inner stator winding coil (21) is electrically connected to the fourth conductive sheet (14); one end of the outer rotor motor (22) is electrically connected to the second conductive sheet (12), and the other end of the outer rotor motor (22) is electrically connected to a negative pole of the power source (5);

a running parameter collecting module (3), configured to collect electric current and running time length parameters of the winch motor (2) in operation and/or a temperature parameter of the winch motor (2) in operation;

a controller (4), configured to, based on the collected electric current and running time length parameters and/or temperature parameter, control a conducted state of the duplex switching relay (1); where the controller (4) is electrically connected to a coil control end of the duplex switching relay (1);

the conducted state comprises the third conductive sheet (13) being electrically conducted with the first conductive sheet (11) or the second conductive sheet (12); and further comprises the fourth conductive sheet (14) being electrically conducted with the first conductive sheet (11) or the second conductive sheet (12).

2. The intelligent control system for a winch motor of claim 1, wherein the controller (4) comprises a control chip and a switching control module (41); the coil control end of the duplex switching relay (1) comprises a first control coil (15) for controlling the fourth conductive sheet (14) to be electrically conducted with the first conductive sheet (11) or the second conductive sheet (12), and a second control coil (16) for controlling the third conductive sheet (13) to be electrically conducted with the first conductive sheet (11) or the second conductive sheet (12);

the switching control module (41) comprises a first contact end (411), a second contact end (412) and a common end (413); the first contact end (411) is electrically connected to one end of the first control coil (15), and the second contact end (412) is electrically connected to one end of the second control coil (16); the other end of the first control coil (15) and the other end of the second control coil (16) are both electrically connected to the negative pole of the power source (5); the common end (413) is electrically connected to the positive pole of the power source (5);

the control chip, based on the collected electric current and running time length parameters and/or temperature parameter, controls the common end (413) to cut off electrical connection with the first contact end (411) or the second contact end (412).

3. The intelligent control system for a winch motor of claim 2, wherein the running parameter collecting module (3) comprises a temperature sensor (31) for collecting a temperature of the winch motor (2) in operation; the temperature sensor (31) is disposed inside the winch motor (2) and is electrically connected to the control chip through a soft lead wire (311).

4. The intelligent control system for a winch motor of claim 2, wherein the running parameter collecting module (3) comprises an electric current sensor (32) for collecting an electric current of the winch motor (2) in operation and a timer for recording a running time length of the winch motor (2) after collection of the electric current parameter; the electric current sensor (32) and the timer both are electrically connected to the control chip;

the control chip, based on a preset electric current range of the collected electric current parameter, generates a corresponding preset running time length of the winch motor (2); the control chip determines whether the running time length of the winch motor (2) recorded by the timer exceeds the corresponding preset running time length of the winch motor (2) so as to control the common end (413) to cut off connection with the first contact end (411) or the second contact end (412) er net.

5. The intelligent control system for a winch motor of claim 4, wherein the electric current sensor (32) is a splitter or direct current transformer.

6. The intelligent control system for a winch motor of claim 3, wherein the temperature sensor (31) is disposed on the inner stator winding coil (21), and a tightening strap (6) for fixing the temperature sensor (31) onto the inner stator winding coil (21) is disposed in the winch motor (2).

7. The intelligent control system for a winch motor of claim 6, wherein the temperature sensor (31) is a thermocouple temperature probe.

8. The intelligent control system for a winch motor of claim 2, wherein the running parameter collecting module (3) comprises a temperature sensor (31) for collecting a temperature of the winch motor (2) in operation; the temperature sensor (31) is disposed inside the winch motor (2) and is electrically connected to the control chip through a soft lead wire (311).

9. The intelligent control system for a winch motor of claim 8, wherein the temperature sensor (31) is disposed on the inner stator winding coil (21), and a tightening strap (6) for fixing the temperature sensor (31) onto the inner stator winding coil (21) is disposed in the winch motor (2).

10. The intelligent control system for a winch motor of claim 9, wherein the temperature sensor (31) is a thermocouple temperature probe.

11. The intelligent control system for a winch motor of claim 2, wherein the running parameter collecting module (3) comprises an electric current sensor (32) for collecting an electric current of the winch motor (2) in operation and a timer for recording a running time length of the winch motor (2) after collection of the electric current parameter; the electric current sensor (32) and the timer both are electrically connected to the control chip;

the control chip, based on a preset electric current range of the collected electric current parameter, generates a corresponding preset running time length of the winch motor (2); the control chip determines whether the running time length of the winch motor (2) recorded by the timer exceeds the corresponding preset running time length of the winch motor (2) so as to control the common end (413) to cut off connection with the first contact end (411) or the second contact end (412).

12. The intelligent control system for a winch motor of claim 11, wherein the electric current sensor (32) is a splitter or direct current transformer.

13. The intelligent control system for a winch motor of claim 1, wherein a prompting module for prompting that the temperature and/or electric current parameters of the winch motor (2) in operation exceed a preset value is further disposed on the controller (4).

14. The intelligent control system for a winch motor of claim 13, wherein the prompting module comprises a loudspeaker and/or an indicator lamp, and the loudspeaker and/or indicator lamp are electrically connected to the controller (4).

15. The intelligent control system for a winch motor of claim 1, wherein the controller (4) is further electrically connected to a Bluetooth control module (7), where the Bluetooth control module (7) is in communication with a wireless control panel.

* * * * *